(12) United States Patent
Bae

(10) Patent No.: US 8,045,053 B2
(45) Date of Patent: Oct. 25, 2011

(54) VIDEO IMAGE DEINTERLACING APPARATUS AND METHODS OF PERFORMING VIDEO IMAGE DEINTERLACING

(75) Inventor: Kee-Sung Bae, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1292 days.

(21) Appl. No.: 11/622,677

(22) Filed: Jan. 12, 2007

(65) Prior Publication Data

US 2007/0200950 A1 Aug. 30, 2007

(30) Foreign Application Priority Data

Feb. 28, 2006 (KR) .................. 10-2006-0019531

(51) Int. Cl.
*H04N 7/01* (2006.01)
(52) U.S. Cl. ........ 348/448; 348/441; 348/449; 348/450; 348/452
(58) Field of Classification Search .................. None
See application file for complete search history.

(56) References Cited

U.S. PATENT DOCUMENTS

| | | | | |
|---|---|---|---|---|
| 6,262,773 | B1 * | 7/2001 | Westerman | 348/448 |
| 6,348,949 | B1 * | 2/2002 | McVeigh | 348/452 |
| 2003/0052995 | A1 * | 3/2003 | Hsu et al. | 348/448 |
| 2003/0189667 | A1 | 10/2003 | Chow | |
| 2005/0168633 | A1 * | 8/2005 | Neuman et al. | 348/448 |
| 2005/0168650 | A1 | 8/2005 | Walls et al. | |
| 2005/0206786 | A1 | 9/2005 | Leaback | |
| 2005/0225672 | A1 * | 10/2005 | Lufkin | 348/448 |
| 2005/0270415 | A1 * | 12/2005 | Jiang et al. | 348/441 |
| 2005/0270417 | A1 * | 12/2005 | Jiang et al. | 348/448 |
| 2006/0012707 | A1 | 1/2006 | Chow | |
| 2006/0072038 | A1 | 4/2006 | Wyman | |

\* cited by examiner

*Primary Examiner* — Brian Yenke
*Assistant Examiner* — Sean Haiem
(74) *Attorney, Agent, or Firm* — Myers Bigel Sibley & Sajovec, P.A.

(57) ABSTRACT

A video image deinterlacing apparatus includes intrafield and interfield processors therein. The intrafield processor is responsive to field data (e.g., sequence of video image fields) depicting a time-varying video image. The intrafield processor is configured to determine edge and edge steepness characteristics for a plurality of omitted pixels within fields of the time-varying video image. The interfield processor, which is also responsive to the field data, is configured to identify pixels possessing time-invariant properties.

12 Claims, 4 Drawing Sheets

VIDEO IMAGE DEINTERLACING APPARATUS AND METHODS OF PERFORMING VIDEO IMAGE DEINTERLACING

REFERENCE TO PRIORITY APPLICATION

This application claims priority under 35 USC §119 to Korean Application Serial No. 10-2006-0019531, filed Feb. 28, 2006, the disclosure of which is hereby incorporated herein by reference.

FIELD OF THE INVENTION

The present invention relates to video image generators and devices and, more particularly, to video image generators and devices that perform deinterlacing operations.

BACKGROUND OF THE INVENTION

Video image data is frequently generated in an interlaced format and then converted into a higher density noninterlaced format that is compatible with progressive displays (e.g., computer displays, HDTVs). In the interlaced format, each frame of video data containing a two-dimensional array of pixels includes an even field of data and an odd field of data that are typically sequentially generated in a repeating even-odd sequence of fields. The even field of data includes pixels located on even-numbered scan lines within the frame and the odd field of data includes pixels located on odd-numbered scan lines within the frame.

In contrast, in the noninterlaced format, which is frequently referred to as a progressive scan format, each video image is represented by a single frame that includes pixels on both even and odd scan lines. Accordingly, deinterlacing techniques to convert video data from an interlaced format to a progressive scan format typically involve operations to double the number of active scan lines. Two fundamental deinterlacing techniques include video mode deinterlacing and film mode deinterlacing. Video mode deinterlacing includes interfield processing and intrafield processing. The simplest method of generating additional scan lines during video mode deinterlacing includes intrafield processing using only information from each field being processed. One of these methods is referred to as scan line duplication, which does not operate to increase vertical resolution within a resulting frame of data. In scan line duplication, each scan line to be generated simply duplicates a prior active scan line. This means that with respect to an odd field of data, each even scan line 2, 4, 6, 8, . . . to be generated is merely a duplicate of a corresponding odd scan line 1, 3, 5, 7, . . . . Similarly, with respect to an even field of data, each odd scan line 1, 3, 5, 7, . . . to be generated is merely a duplicate of a corresponding even scan line 2, 4, 6, 8, . . . . Another method using intrafield processing is referred to as scan line interpolation, which generates interpolated scan lines between the original active scan lines. The simplest implementation of scan line interpolation uses linear interpolation to generate each added scan line as an average of an immediately adjacent upper active scan line and an immediately adjacent lower active scan line.

One of the simplest methods of generating additional scan lines using interfield processing includes field merging. This technique merges two consecutive fields together to produce each frame of video data. In particular, the active scan lines associated with each field of video data are combined with the active scan lines associated with an immediately previous field of video data to thereby yield a sequence of frames at a frame rate equivalent to the rate at which the original fields of video data are generated. Using this method, the vertical resolution of each frame of data is doubled only in regions of no movement. However, moving objects within each generated frame of data will typically have artifacts (e.g., double images) caused by the time difference between each pair of fields used to generate a corresponding frame.

To address this problem of artifacts, motion adaptive deinterlacing techniques have been developed. One such technique is disclosed in U.S. patent Publication No. 2005/0270417 to Jiang et al., entitled "Deinterlacing Video Images with Slope Detection." In particular, Jiang et al. discloses a video image deinterlacer having a slope protection system therein that determines directions (i.e., slopes) for diagonal lines along an edge of an object being displayed. A similar technique is also disclosed in U.S. patent Publication No. 2005/0168633 to Neuman et al., entitled "Method and System for Motion Adaptive Deinterlacer with Integrated Directional Filter." In particular, Neuman et al. disclose a method for detecting an edge in an image and determining a direction of the edge. A filter is then selected using the direction of the edge in the image and a spatial average of the edge in the image is produced using the selected filter.

SUMMARY OF THE INVENTION

Embodiments of the present invention include a video image deinterlacing apparatus having intrafield and interfield processors therein. The intrafield processor is responsive to field data (e.g., sequence of video image fields) depicting a time-varying video image. The intrafield processor is configured to determine edge and edge steepness characteristics for a plurality of omitted pixels within fields of the time-varying video image. The interfield processor, which is also responsive to the field data, is configured to identify pixels possessing time-invariant properties.

In particular, the intrafield processor is configured to determine edge and edge steepness characteristics for an omitted pixel within a first field by determining first first-order differences between a plurality of pixel values for pixels within the first field located along a first line extending across the omitted pixel at a first angle. The intrafield processor is further configured to determine the edge and edge steepness characteristics for the omitted pixel within the first field by determining second first-order differences between a plurality of pixel values for pixels within the first field located along a second line extending across the first field at a second angle orthogonal to the first angle. Furthermore, the intrafield processor is configured to determine the edge and edge steepness characteristics for the omitted pixel within the first field by determining second-order differences from the first-order differences. These calculations also include determining a threshold pixel value difference associated with pixels within a predetermined range of pixels surrounding the omitted pixel. These same operations are performed for each of the omitted pixels within a field of image data.

In contrast, the interfield processor is configured to identify a time-invariant property for the omitted pixel within the first field by evaluating a difference in pixel value between a pixel in a subsequent field and a corresponding pixel in a predecessor field having the same active lines as the subsequent field. The interfield processor also determines the time-invariant properties by evaluating a difference in pixel value between a pixel in the predecessor field that corresponds to the omitted pixel and an upper line pixel adjacent the omitted pixel in the first field, and evaluating a difference in pixel value between the pixel in the predecessor field and a lower line pixel adjacent the omitted pixel in the first field.

DETAILED DESCRIPTION OF PREFERRED EMBODIMENTS

Figure 1:
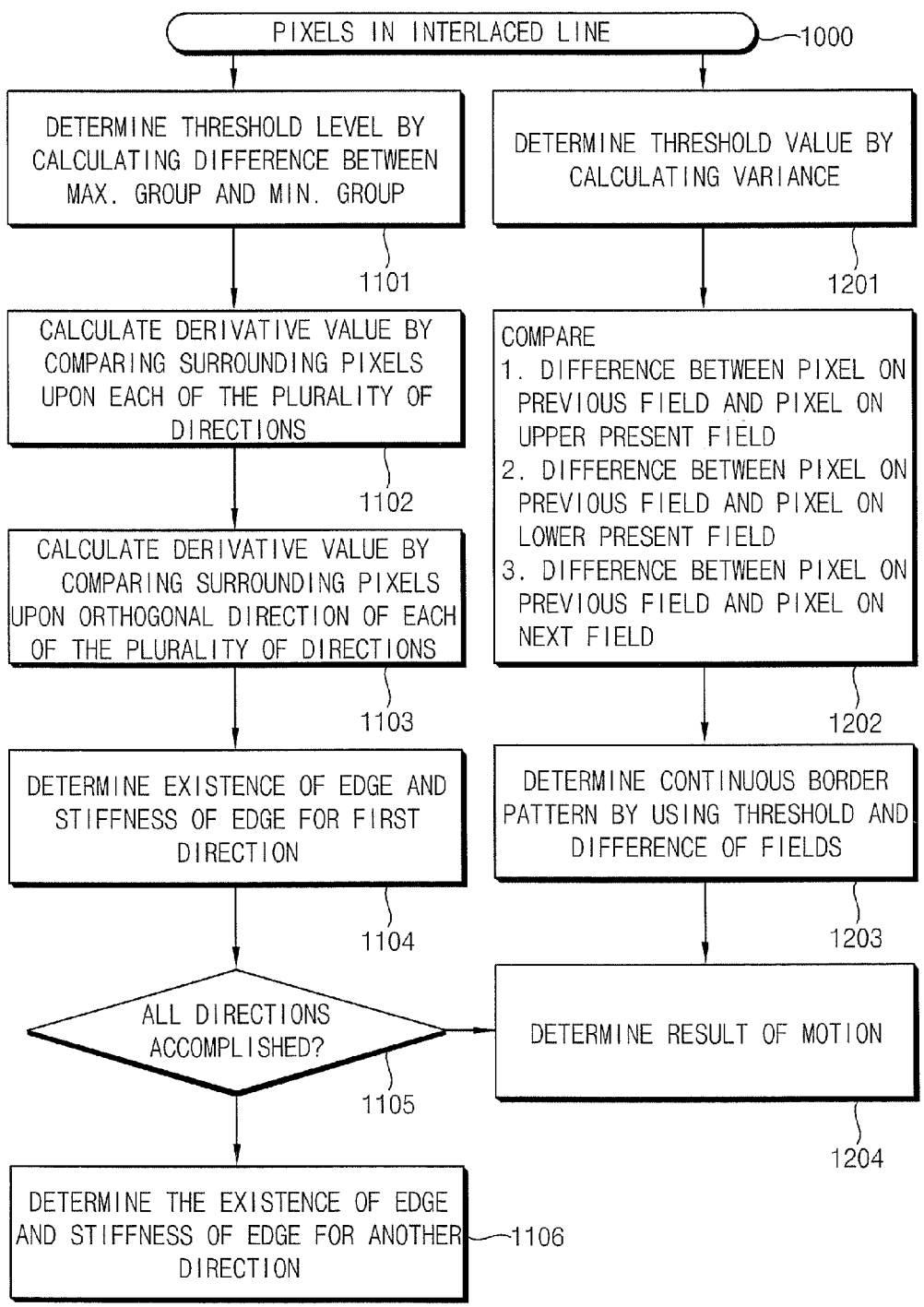
FIG. 1 is a flow diagram of operations that illustrates methods of deinterlacing video images, according to embodiments of the present invention.

The present invention now will be described more fully herein with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout and signal lines and signals thereon may be referred to by the same reference characters.

Methods of deinterlacing video images according to embodiments of the invention include operations to determine the approximate value of pixels within a plurality of omitted scan lines on each of a plurality of consecutive fields of a time-varying video image. These operations 1000, which are illustrated by FIG. 1, include operations performed by an intrafield processor and operations performed by an interfield processor. As described more fully with respect to FIG. 2, an embodiment of an intrafield processor includes a slope variation detector 210 and an embodiment of an interfield processor includes a border pattern detector 220. The slope variation detector 210 and the border pattern detector 220 operate within a graphics border detector 110 that generates outputs to an adaptive motion detector 130. This intrafield processor performs at least the operations illustrated on the left side of the flow diagram of FIG. 1, which are shown by Blocks 1101-1106, and the interfield processor performs at least the operations illustrated on the right side of the flow diagram of FIG. 1, which are shown by Blocks 1201-1203.

In particular, the operations performed by the slope variation detector 210 include operations 1101 to determine a threshold pixel level associated with a field of video image data having active scan lines, which display actual video data, and omitted scan lines, which ultimately display calculated (i.e., approximate) video data determined by the deinterlacing operations described herein. These operations 1101 to determine a threshold pixel level can include determining an absolute value of a difference between a sum of the three (3) maximum pixel values associated with the entire field (or subset of the entire field) and a sum of the three (3) minimum pixel values associated with the entire field (or subset of the entire field) and dividing this difference by three to obtain an average pixel value. This average pixel value may then be multiplied by an experimentally predetermined numeric constant α to yield an accurate threshold pixel level used in the aforementioned operations. The use of three maximum pixel values and three minimum pixel values may be adjusted upward or downward depending on application.

Referring now to Block 1102, derivative values are calculated by comparing the pixel values of pixels that are: (i) associated with the active scan lines in a field of data, and (ii) intersect a line passing through an omitted pixel having a value to be determined. These operations are performed for each omitted pixel in the field of data. The calculation of these derivative values (i.e., pixel value differences) for a given diagonal line direction supports a determination of whether the omitted pixel extends along an edge of an object displayed by the field of data. These calculations are made for each of a plurality of diagonal lines that pass through the omitted pixel along different directions. As illustrated by Block 1103, derivative values are also calculated for active pixels located at various points along lines that extend orthogonal to the diagonal lines that pass through the omitted pixel.

These calculated derivative values associated with a corresponding line passing through an omitted pixel (and at least one corresponding orthogonal line) are then processed to determine whether the omitted pixel is located along an edge of an object being displayed and, if so, the sharpness (i.e., stiffness) of this edge, Block 1104. Operations to determine sharpness of an edge include determining second-order differences from the first-order differences. These operations are performed for each of the lines of different angle that pass through the omitted pixel under evaluation, Blocks 1105-1106.

Figure 3:
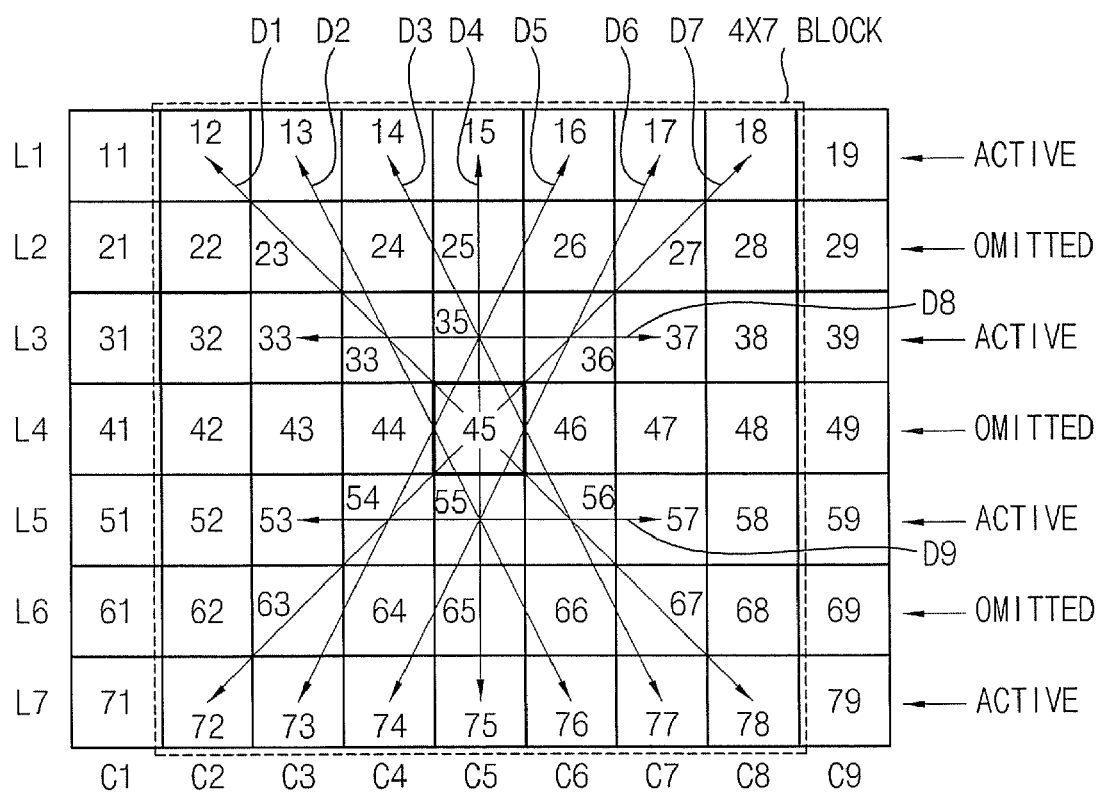
FIG. 3 is a diagram that illustrates a 7×9 field of image data having four active scan lines of actual image data and three omitted scan lines to be approximated by the deinterlacing operations illustrated by FIG. 1.

FIG. 3 is a diagram that illustrates a 7×9 field of image data having four active scan lines of actual image data and three omitted scan lines to be approximated using the operations described herein. These scan lines are illustrated as lines L1-L7, which span nine columns C1-C9. Based on the operations described above with respect to the left side of FIG. 1, a first set of derivative values can be calculated by comparing the pixel values of pixels that are associated with the active scan lines L1, L3, L5 and L7 (in a 4×7 block within the field of data) and intersect diagonal line D1 passing through an omitted pixel (e.g., pixel 45) to be approximated. Thus, if pixels 12, 34, 56 and 78 intersected by diagonal line D1 have data values equal to 0, 20, 80 and 100, respectively, then the first-order differences are equal to 20 (i.e., 20−0), 60 (i.e., 80−20) and 20 (i.e., 100−80) and second-order differences are equal to 40 (i.e., 60−20) and 40 (|20−60|). Similarly, a second set of derivative values can be calculated by comparing the pixel values of pixels that intersect diagonal line D2, which passes through the omitted pixel 45 under evaluation. Third, fourth, fifth, sixth and seventh sets of derivative values can also be calculated with respect to the diagonal lines D3-D7. Similarly, the derivative values associated with diagonal lines D8 and D9, which are orthogonal to diagonal line D4, can be calculated along with derivative values for other diagonal lines (not shown) that are orthogonal to the diagonal lines D1-D3 and D5-D7.

Referring now to the right side of FIG. 1, the operations performed by the border pattern detector 220 include determining a threshold pixel value by calculating a variance of the pixel data in the active scan lines of the field of video data being evaluated, Block 1201. This variance is a square of the standard deviation of the pixel values. The border pattern detector 1202 also calculates a plurality of difference values. In particular, as illustrated by Block 1202 in FIG. 1 and FIG. 4, a comparison is made between a plurality of pixels located in a plurality of consecutive fields ((t−1), t and (t+1)) in order to determine whether an omitted pixel to be approximated possesses time-invariant properties and can therefore be treated as a border pattern that remains constant across a plurality of consecutive frames of video image data. The comparison operations illustrated at Block 1202 include determining a first difference between a pixel value associated with a pixel in a prior field and a pixel value associated with a pixel located above and immediately adjacent the omitted pixel under evaluation in the present field. Thus, as illustrated by the arrows in FIG. 4, a pixel value for pixel 4,5 in the (t−1) field is compared to a pixel value for pixel 3,5 in the present field t, which is located immediately above omitted pixel 4,5 in the present field. The comparison operations also include determining a second difference between a pixel value associated with a pixel in a prior field and a pixel value associated with a pixel located below and immediately adjacent the omitted pixel under evaluation in the present field. Thus, as illustrated by the arrows in FIG. 4, a pixel value for pixel 4,5 in the (t−1) field is compared to a pixel value for pixel 5,5 in the present field t, which is located immediately below omitted pixel 4,5 in the present field. Still further, the comparison operations include determining a third difference between a pixel value associated with a pixel in a prior field and a pixel value associated with a pixel located in a subsequent field. Thus, as illustrated by the arrows in FIG. 4, a pixel value for pixel 4,5 in the (t−1) field is compared to a pixel value for pixel 4,5 in the (t+1) field. These first, second and third differences and the variance value are then used to determine whether the omitted pixel to be approximated possesses time-invariant properties (e.g., is part of a continuous border pattern), Block 1203.

Figure 2:
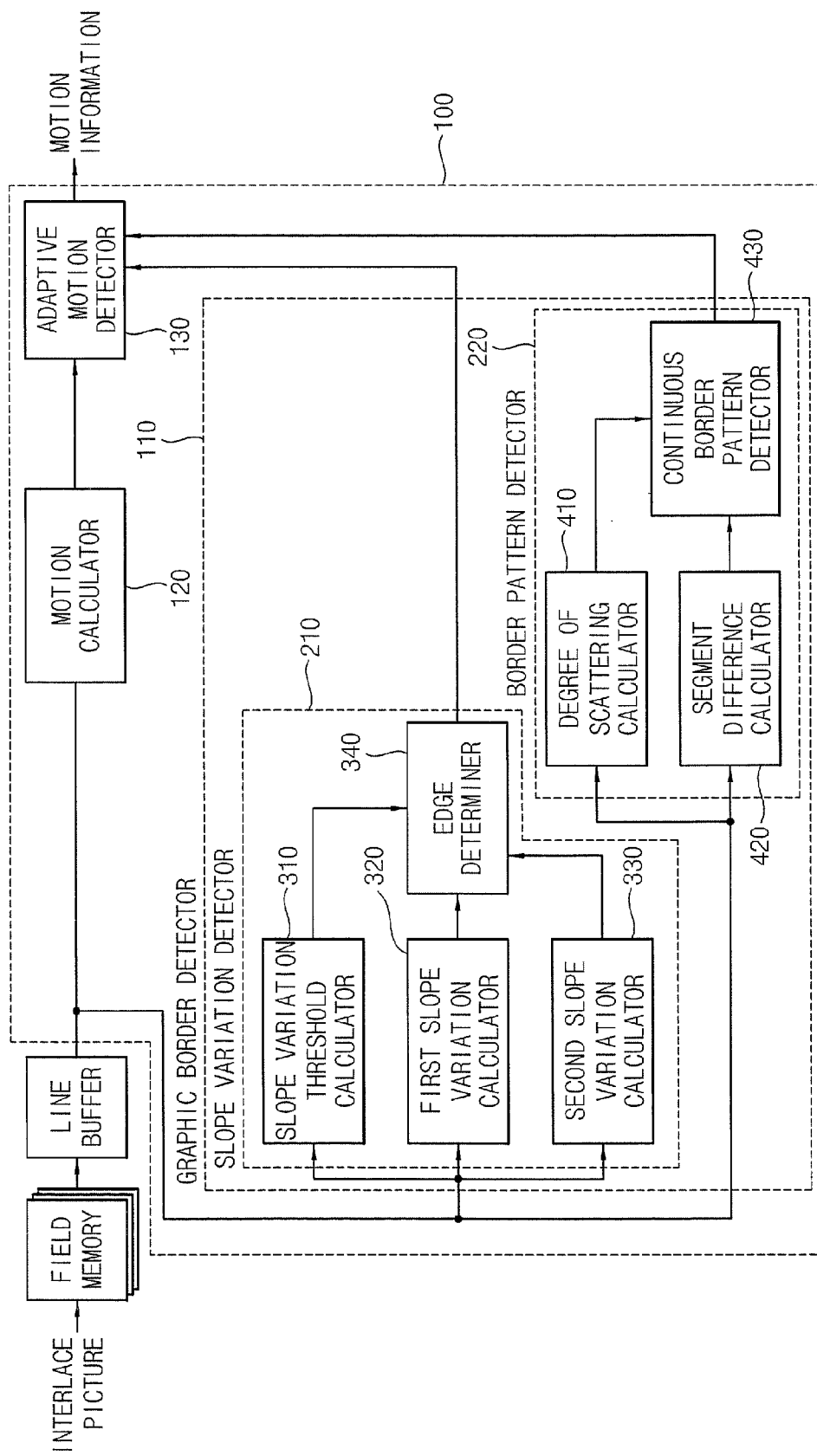
FIG. 2 is a block diagram of a video image deinterlacing apparatus, according to embodiments of the present invention.

FIG. 2 is a block diagram of a video image deinterlacing apparatus 100 that is configured to perform the operations illustrated by FIG. 1. As illustrated in FIG. 2, the video image deinterlacing apparatus 100 includes a motion calculator 120, an adaptive motion detector 130 and a graphic border detector 110, connected as illustrated. The motion calculator is configured to receive buffered video image data (interlaced data) that is generated from a conventional line buffer and field memory. The graphic border detector 110 includes a slope variation detector 210 and a border pattern detector 220. These detectors 210 and 220 receive buffered video image data from the line buffer.

The slope variation detector 210 includes a slope variation threshold calculator 310, first and second slope variation calculators 320 and 330, respectively, and an edge determiner 340. As illustrated, the edge determiner 340 is configured to receive output signals generated by the slope variation threshold calculator 310 and the first and second slope variation calculators 320 and 330. The slope variation threshold calculator 310 determines a threshold pixel level (Tm) associated with a main direction (see, e.g., diagonal line in FIG. 3), a threshold pixel level (To) associated with an orthogonal direction) and a threshold level (T2) of a second derivative by determining maximum and minimum groups in the values of pixels surrounding a target pixel and determining a difference in these maximum and minimum groups. The first slope variation calculator 320 determines a sum (Sm1) of the absolute values of the first derivative values associated with pixels in the main direction and determines a sum (Sm2) of the absolute values of the second derivative values associated with pixels in the main direction. In contrast, the second slope variation calculator 330 determines, from the values of the pixels in the orthogonal direction, a sum (So) of the absolute values of the first derivative values associated with pixels in the orthogonal direction. The edge determiner 340 generates an output signal(s) that is provided to the adaptive motion detector 130. The edge determiner 340 may determine an existence of an edge by comparing Sm1 to Tm (i.e., is Sm1>Tm?) and comparing Sm2 to To (i.e., is Sm2<To?). The edge determiner 340 also determines edge steepness by comparing So to T2 (i.e., is So>T2?).

The border pattern detector 220 includes a degree of scattering calculator 410, a segment difference calculator 420 and a continuous border pattern detector 430, which generates an output signal(s) that is provided to the adaptive motion detector 130. The degree of scattering calculator 410 determines a standard deviation of pixel values for pixels surrounding a target pixel and determines a threshold level of a border using the standard deviation and a predetermined value. Referring again to FIGS. 2 and 4, the segment difference calculator 420 determines a first difference between the pixel value of the identified pixel of the "t+1" field (shown as (4,5)) and the identified pixel of the "t−1" field (shown as (4,5)) for the case where the target pixel is (4,5) in the "t" field. The segment difference calculator 420 also determines a second difference between the pixel value of the identified pixel of the "t−1" field (shown as (4,5)) and the identified upper pixel of the "t" field (shown as (3,5)). Similarly, the segment difference calculator 420 also determines a third difference between the pixel value of the identified pixel of the "t−1" field (shown as (4,5)) and the identified lower pixel of the "t" field (shown as (5,5)). With this information, the continuous border pattern detector 430 detects whether the target pixel (e.g., pixel (4,5) in the "t" field) is associated with an edge of a displayed image. In particular, the target pixel may be detected as being associated with an edge if the first difference is less than a predetermined threshold level and the second difference is greater than the predetermined threshold or if the third difference is greater than the predetermined threshold.

The operations performed by the degree of scattering calculator 410, the segment difference calculator 420 and the continuous border pattern detector 430 will now be described more fully with respect to the following example, which is provided solely to illustrate one possible example of the operations described herein. In this example, an image is provided with a distinct edge characteristic to be identified. This image is provided by the following pixel values for the frames (t−1), t and (t+1), where the image for frame t is a 4×7 block of active pixels and "X" represents the target pixel to be evaluated within the 28 related pixels (4 rows by 7 columns):

| | | | | | | | | | | | | | | | | | | | | | | | |
|---|---|---|---|---|---|---|---|---|---|---|---|---|---|---|---|---|---|---|---|---|---|---|---|
| L1 | | | | | | | | | 1 | 1 | 1 | 1 | 1 | 1 | 1 | | | | | | | | |
| L2 | 1 | 1 | 1 | 1 | 1 | 1 | 1 | | | | | | | | | | 1 | 1 | 1 | 1 | 1 | 1 | 1 |
| L3 | | | | | | | | | 1 | 1 | 1 | 4 | 1 | 1 | 1 | | | | | | | | |
| L4 | 1 | 5 | 5 | 5 | 5 | 1 | 1 | | | | | X | | | | | 1 | 5 | 5 | 5 | 5 | 1 | 1 |
| L5 | | | | | | | | | 1 | 1 | 5 | 5 | 1 | 1 | 1 | | | | | | | | |
| L6 | 1 | 5 | 5 | 5 | 1 | 1 | 1 | | | | | | | | | | 1 | 1 | 5 | 5 | 1 | 1 | 1 |
| L7 | | | | | | | | | 1 | 1 | 5 | 5 | 1 | 1 | 1 | | | | | | | | |
| | | | | t−1 | | | | | | | | t | | | | | | | | t+1 | | | |

Operations performed by the degree of scattering calculator 410 include determining a threshold pixel value. According to one embodiment of the present invention, the threshold pixel value can be calculated as equivalent to the square root of the following quantity: (Σ entry values of matrix B/# of related pixels). The pixel values of matrix B are equivalent to the square of the pixel values of matrix A minus the average of the pixel values of matrix A. The matrix A is equivalent to the combined pixel values provided in frames (t−1) and t, which is illustrated as follows:

| MATRIX A | | | | | | |
|---|---|---|---|---|---|---|
| 1 | 1 | 1 | 1 | 1 | 1 | 1 |
| 1 | 1 | 1 | 1 | 1 | 1 | 1 |
| 1 | 1 | 1 | 4 | 1 | 1 | 1 |
| 1 | 5 | 5 | 5 | 5 | 1 | 1 |
| 1 | 1 | 5 | 5 | 1 | 1 | 1 |
| 1 | 1 | 5 | 5 | 1 | 1 | 1 |
| 1 | 1 | 5 | 5 | 1 | 1 | 1 |

Based on these values of matrix A, which yield an average pixel value of 2 (92/(7×7=49), the values of matrix B can be obtained as follows:

| MATRIX B | | | | | | |
|---|---|---|---|---|---|---|
| 1 | 1 | 1 | 1 | 1 | 1 | 1 |
| 1 | 1 | 1 | 1 | 1 | 1 | 1 |
| 1 | 1 | 1 | 4 | 1 | 1 | 1 |
| 1 | 9 | 9 | 9 | 9 | 1 | 1 |
| 1 | 1 | 9 | 9 | 1 | 1 | 1 |
| 1 | 1 | 9 | 9 | 1 | 1 | 1 |
| 1 | 1 | 9 | 9 | 1 | 1 | 1 |

The sum of the values of matrix B equals 132 (7(row1)+7(row 2)+10(row 3)+39(row 4)+23(row5)+23(row 6)+23(row 7)=132). Based on these values, the threshold pixel value can be computed as equal to $2.17=(132/28)^{0.5}$.

Figure 4:
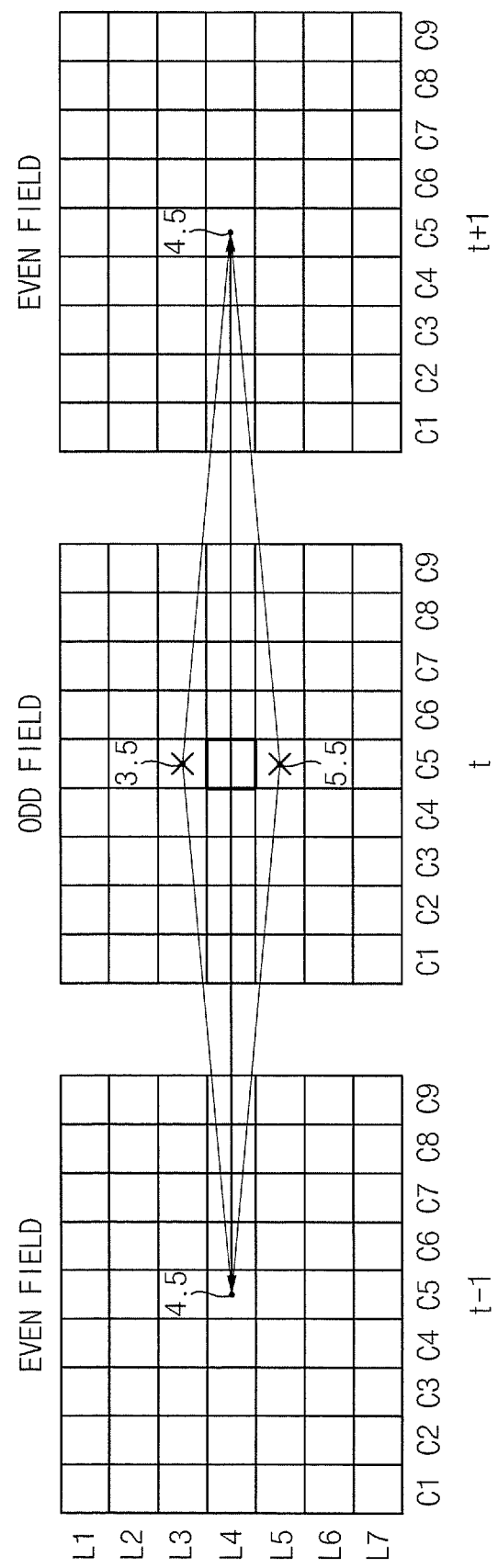
FIG. 4 is a diagram that illustrates a plurality of fields of video image data spanning three time intervals ((t−1), t and (t+1)).

The segment difference calculator 420 evaluates the differences in a plurality of pixel values relative to target pixels (shown as X in frame "t"), as described above (see, e.g., FIG. 4). The pixels under consideration are illustrated by the following highlighted values for frames (t−1), t and (t+1):

| L1 | | | | | | | | | | | | | | | | | |
|---|---|---|---|---|---|---|---|---|---|---|---|---|---|---|---|---|---|
| L2 | | | | | | | | | | | | | | | | | |
| L3 | | | | | | | | 1 | 1 | 4 | 1 | 1 | | | | | |
| L4 | | 5 | 5 | 5 | 5 | 1 | | X | X | X | X | X | | 5 | 5 | 5 | 5 | 1 |
| L5 | | | | | | | | 1 | 5 | 5 | 1 | 1 | | | | | |
| L6 | | | | | | | | | | | | | | | | | |
| L7 | | | | | | | | | | | | | | | | | |
| | | | t−1 | | | | | | | t | | | | | | t+1 | |

Based on these values, differences may be computed by evaluating (i) differences between the upper pixels in the t frame relative to corresponding target pixels on the t−1 frame, (ii) differences between the lower pixels in the t frame relative to corresponding target pixels on the t−1 frame, and (iii) differences between target pixel on the t−1 frame and the target pixel on the t+1 frame. These computations result in the following calculated differences (3×5 matrix):

(5 5 5 5 1)−(1 1 4 1 1)=(4 4 1 4 0)   i (5 5 5 5 1)−(1 5 5 1 1)=(4 0 0 4 0)   ii (5 5 5 5 1)−(5 5 5 5 1)=(0 0 0 0 0)   iii The continuous border pattern detector 430 computes a matrix of values by multiplying the calculated 3×5 matrix of differences by a weight vector, which is shown as a 5×1 vector having a value of (1 2 2 2 1), to yield the following values for the upper row, lower row and target row:

| upper: | 4 8 2 8 0 |
|---|---|
| lower: | 4 0 0 8 0 |
| target: | 0 0 0 0 0 |

These fifteen values are used to calculate the following quantities: diff_upper=Σ4+8+2+8+0=22 (for upper row), diff_lower=Σ4+0+0+8+0=12 (for lower row) and diff_prev=Σ0+0+0+0+0=0 (for target row). These quantities: diff_upper=22, diff_lower=12 and diff_prev=0 are then compared to the threshold pixel value (2.17) determined by the degree of scattering calculator 410. In particular, a target pixel under consideration can be identified as being an "edge" pixel whenever at least one of two conditions is present: (i) the value diff_prev is less than the threshold pixel value and the value diff_upper is greater than the threshold pixel value; or (ii) the value diff_prev is less than the threshold pixel value and the value diff_lower is greater than the threshold pixel value. Based on these two conditions, the target pixel (X) can be identified as an edge pixel because:

$$\text{diff\_prev} = 0 \text{ is} < 2.17;$$
$$\text{diff\_upper} = 22 > 2.17; \text{ and}$$
$$\text{diff\_lower} = 12 > 2.17.$$

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A video image deinterlacing apparatus, comprising:
   an intrafield processor responsive to field data depicting a time-varying video image, said intrafield processor configured to determine edge and edge steepness characteristics for a plurality of omitted pixels within a first field of the time-varying video image; and
   an interfield processor responsive to the field data, said interfield processor configured to identify pixels within the first field possessing time-invariant properties;
   wherein said intrafield processor is configured to determine edge and edge steepness characteristics for an omitted pixel within the first field by determining first differences between a plurality of pixel values for pixels within the first field located along a first line extending across the omitted pixel at a first angle and determining a sum of the first differences using a first slope variation calculator; and wherein said intrafield processor is further configured to determine edge and edge steepness characteristics for the omitted pixel within the first field by determining second differences between a plurality of pixel values for pixels within the first field located along a second line extending across the first field at a second angle orthogonal to the first angle and determining a sum of the second differences using a second slope variation calculator.

2. The deinterlacing apparatus of claim 1, wherein said intrafield processor is configured to determine edge and edge steepness characteristics for an omitted pixel within the first field by determining second-order differences from the first differences.

3. The deinterlacing apparatus of claim 1, wherein said intrafield processor is configured to determine edge and edge steepness characteristics for an omitted pixel within the first field by determining a threshold pixel value difference associated with a plurality of pixels surrounding the omitted pixel.

4. The deinterlacing apparatus of claim 1, wherein said interfield processor is configured to identify a time-invariant property for an omitted pixel within the first field by evaluating a difference in pixel value between a pixel in a subsequent field and a corresponding pixel in a predecessor field having the same active lines as the subsequent field.

5. The deinterlacing apparatus of claim 4, wherein said interfield processor is configured to identify a time-invariant property for the omitted pixel within the first field by evaluating a difference in pixel value between a corresponding pixel in the predecessor field and an upper line pixel adjacent the omitted pixel in the first field.

6. The deinterlacing apparatus of claim 5, wherein said interfield processor is configured to identify a time-invariant property for the omitted pixel within the first field by evaluating a difference in pixel value between a corresponding pixel in the predecessor field and a lower line pixel adjacent the omitted pixel in the first field.

7. A video image deinterlacing apparatus, comprising:

an intrafield processor responsive to field data depicting a time-varying video image, said intrafield processor configured to determine edge and edge steepness characteristics for a plurality of omitted pixels within a first field of the time-varying video image;

wherein said intrafield processor is configured to determine edge and edge steepness characteristics for an omitted pixel within the first field by determining first differences between a plurality of pixel values for pixels within the first field located along a first line extending across the omitted pixel at a first angle and determining a sum of the first differences using a first slope variation calculator; and wherein said intrafield processor is further configured to determine edge and edge steepness characteristics for the omitted pixel within the first field by determining second differences between a plurality of pixel values for pixels within the first field located along a second line extending across the first field at a second angle orthogonal to the first angle and determining a sum of the second differences using a second slope variation calculator.

8. The deinterlacing apparatus of claim 7, wherein said intrafield processor is configured to determine edge and edge steepness characteristics for an omitted pixel within the first field by determining second-order differences from the first differences.

9. A video image deinterlacing apparatus, comprising:

an intrafield processor responsive to field data depicting a time-varying video image, said intrafield processor configured to determine edge characteristics for a plurality of omitted pixels within a first field of the time-varying video image; and an interfield processor responsive to the field data, said interfield processor configured to identify pixels within the first field possessing time-invariant properties;

wherein said intrafield processor is configured to determine edge characteristics for an omitted pixel within the first field by determining first differences between a plurality of pixel values for pixels within the first field located along a first line extending across the omitted pixel at a first angle and determining a sum of the first differences using a first slope variation calculator; and wherein said intrafield processor is further configured to determine edge characteristics for the omitted pixel within the first field by determining second differences between a plurality of pixel values for pixels within the first field located along a second line extending across the first field at a second angle orthogonal to the first angle and determining a sum of the second differences using a second slope variation calculator.

10. The deinterlacing apparatus of claim 9, wherein said intrafield processor is configured to determine edge characteristics for an omitted pixel within the first field by determining second-order differences from the first differences.

11. The deinterlacing apparatus of claim 9, wherein said intrafield processor is configured to determine edge characteristics for an omitted pixel within the first field by determining a threshold pixel value difference associated with a plurality of pixels surrounding the omitted pixel.

12. The deinterlacing apparatus of claim 9, wherein said interfield processor is configured to identify a time-invariant property for an omitted pixel within the first field by evaluating a difference in pixel value between a pixel in a subsequent field and a corresponding pixel in a predecessor field having the same active lines as the subsequent field.

* * * * *